United States Patent [19]

Dlugos

[11] 4,131,946
[45] Dec. 26, 1978

[54] MAILING SYSTEM

[75] Inventor: Daniel F. Dlugos, Huntington, Conn.

[73] Assignee: Pitney-Bowes, Inc., Stamford, Conn.

[21] Appl. No.: 750,534

[22] Filed: Dec. 14, 1976

[51] Int. Cl.² .................. G06F 15/20; G01G 23/42
[52] U.S. Cl. .................................... 364/466; 177/5;
177/25; 364/567
[58] Field of Search .............. 235/151.33, 58 PS;
177/5, 25, 58, 61; 340/173 LM; 364/466, 567,
568, 464

[56] References Cited
U.S. PATENT DOCUMENTS

| 3,594,735 | 7/1971 | Furlong et al. | 340/173 LM |
| 3,635,297 | 1/1972 | Salava | 177/5 |
| 3,692,988 | 9/1972 | Dlugos et al. | 235/151.33 |
| 3,890,492 | 6/1975 | Manduley et al. | 235/151.33 |
| 4,047,006 | 9/1977 | Ellner | 177/25 |

Primary Examiner—Charles E. Atkinson
Assistant Examiner—Errol A. Krass
Attorney, Agent, or Firm—Peter Vrahotes; William D. Soltow, Jr.; Albert W. Scribner

[57] ABSTRACT

A system for mailing articles includes an integrated circuit interface between a scale deflection transducer, a processor and an external memory. The interface includes a multifunction shift register array which is adapted to receive count data indicative of the weight of an article. Communication between the shift register array, the processor and the memory is such that the shift registers are selectively utilized for memory address and data transfer without the necessity of clearing prior operands.

7 Claims, 6 Drawing Figures

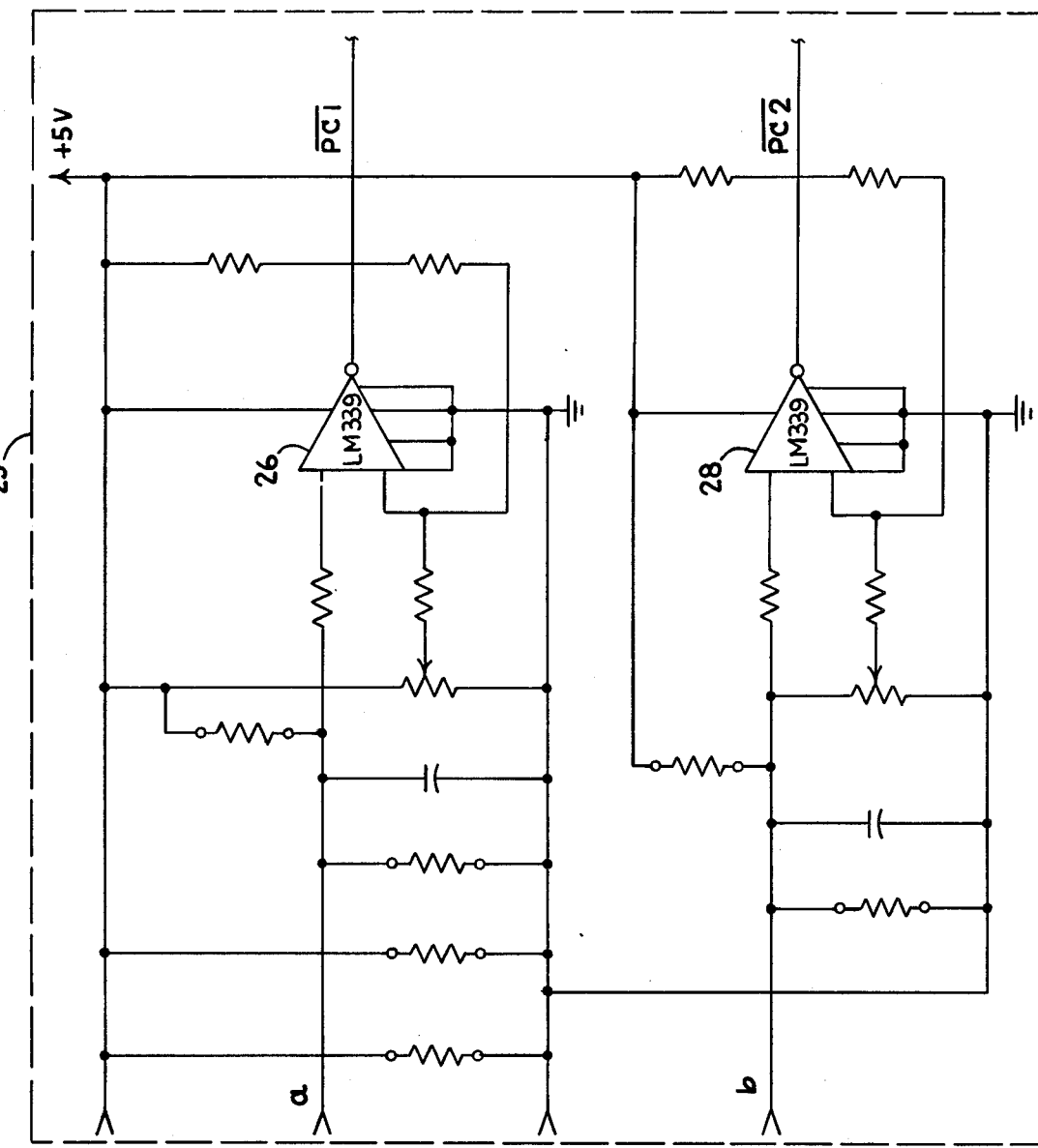
FIG. 4
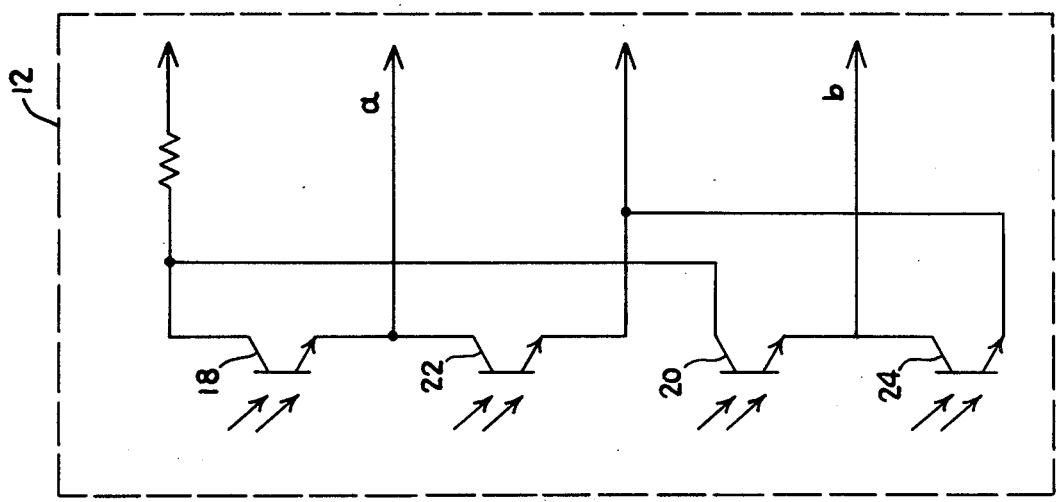

MAILING SYSTEM

RELATED APPLICATIONS

The present invention relates to an integrated circuit interface between a transducer, a microprocessor and an external memory adapted for use in a weight measuring environment such as that disclosed in the following copending applications, all owned by the assignee of the present invention: Weighing with Moire Optoelectronic Transducer, Ser. No. 653,850 filed Jan. 30th, 1976, now U.S. Pat. No. 4,044,487, issued Aug. 30, 1977. Leaf Spring Weighing Scale with Optical Detector, Ser. No. 655,393 filed Feb. 5th 1976, and now abandoned, and Zero Load Adjustment Apparatus for Spring Weighing Scale, Ser. No. 669,528, filed Mar. 23rd, 1976 now U.S. Pat. No. 4,047,586, issued Sept. 13, 1977.

BACKGROUND OF THE INVENTION

1. Field of the Invention

This invention relates generally to digital circuits for processing signals and more specifically to circuits for providing a multiple function interface to a central processing unit.

2. Brief Description of the Prior Art

Various devices have been heretofore proposed for the purpose of determining the position of a movable element by processing the pulse signal outputs of an electro-optical transducer for applications such as weight measuring evironments. Examples of such prior devices are illustrated in United States Letters Patent No. 2,886,717 and United States Letters Patent No. 3,487,399.

Earlier signal processing and counting systems employed RC networks which were time and temperature dependent and did not provide well defined pulse widths. Additionally, these systems were highly susceptible to both internal and external noise which resulted in generally poor reliability.

While the signal processing system illustrated in a copending related application entitled Counting System, Ser. No. 715,883, filed Aug. 19, 1976, provided reliable signal processing in a weight measuring environment and adapted to optically define true scale zero displacement in an unambiguous manner, various drawbacks have been encountered in transmitting counter data to microprocessing means for processing. The microprocessor was required to perform numerous calculations in determining the article weight from the counter data including the averaging of counter readings and unit conversion from displacement counts to weight units. Further, the mircoprocessor performed computations to determine postage based upon weight and article destination. Tradionally, such microprocessors utilized separate registers for addressing and data lines which provided inherent limitations in input/output capabilities. With limited register space, the microprocessor was required to rapidly unload counter data, because new counter data was entering. Further, there was a hazard that count data might be unloaded into the microprocessor during propagation of a count.

SUMMARY OF THE INVENTION

In compendium, the invention comprises a mailing system including an optical scale transducer which generates cyclic signal pairs as a result of tare displacement; the signal pairs are shaped to provide digital signals, edge discriminated, and fed to an up/down counter array. A microprocessor interface includes a plurality of multifunction shift registers which receive the outputs of the counter stages for input into the microprocessor. In order to prevent a counter array reading from being taken during propagation of a count, the counter input signals are monitored to control a time delay coordinated with the count propagation time.

Shift register data can be transmitted to the microprocessor in either parallel or serial modes, and the shift registers are utilized not only as a link between the counter and the processor, but further as memory address registers and temporary data storage registers.

Implementation of the shift registers is such that new data may be shifted in and stored data shifted out for utilization during the same clock pulses; further, data may be parallel loaded into the shift registers without clearing prior data.

From the above summary, it can be appreciated that it is an object of the present invention to provide a mailing system of the general character described which is not subject to the disadvantages aforementioned.

It is a further object of the present invention to provide a mailing system of the general character described which includes a spring scale having an electro-optical transducer, processing circuits for providing weight indicative count signals and a multifunction register link between the count signals and a microprocessor.

A further object of the present invention is to provide a mailing system of the general character described having an integrated circuit interface between an electro-optical scale transducer and a microprocessor.

Yet a further object of the present invention is to provide a mailing system of the general character described which includes a circuit adapted to prevent inadvertent loading of counter data during the propagation of a count signal through a counter.

Yet a further object of the present invention is to provide a mailing system of the general character described having an interface between a microprocessor and a transducer which permits selective communication links for processor inputs, memory address, and temporary data storage.

Another object of the present invention is to provide a processor interface of the general character described which includes a multifunction communication means between a processor, an external memory and/or a peripheral device.

Yet another object of the present invention is to provide a processor interface of the general character described which provides reduced cycle time by utilization of shift registers adapted to load new data without clearing prior data.

A further object of the present invention is to provide a processor interface of the general character described which provides reduced cycle time by utilizing shift registers adapted to simultaneously load new data and shift prior data to the processor.

Further objects of the present invention in part will be obvious and in part will be pointed out hereinafter.

With these ends in view, the invention finds embodiment in certain combinations of elements, arrangements of parts and series of steps by which the objects aforementioned and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention:

FIG. 4 is a schematic diagram illustrating a photocell array of an electro-optical transducer and a wave shaping circuit which provides pulse waveforms;

DESCRIPTION OF THE PREFERRED EMBODIMENT

The present invention relates to a mailing system which determines the weight of an article by processing a pair of electro-optically generated waveforms which are a function of the displacement of a spring scale. The signals are counted, with the counter signals being fed to a processor for averaging and computation of the load weight. The processor further computes the postage required for the article.

Included in the mailing system are wave shaping circuits for each waveform, pulse edge discriminating circuits and a combination logic for determining the direction of count, i.e. decreasing or increasing.

An intergrated circuit interface is provided for receiving and processing the shaped waveform signals. The interface includes an up/down counter array, the outputs of which are fed to a microprocessor through a plurality of multifunction shift registers with the shift registers serving as memory registers and as intermediate storage registers. Further, the multifunction shift registers are adapted to be loaded without separately clearing prior data.

Figure 1:
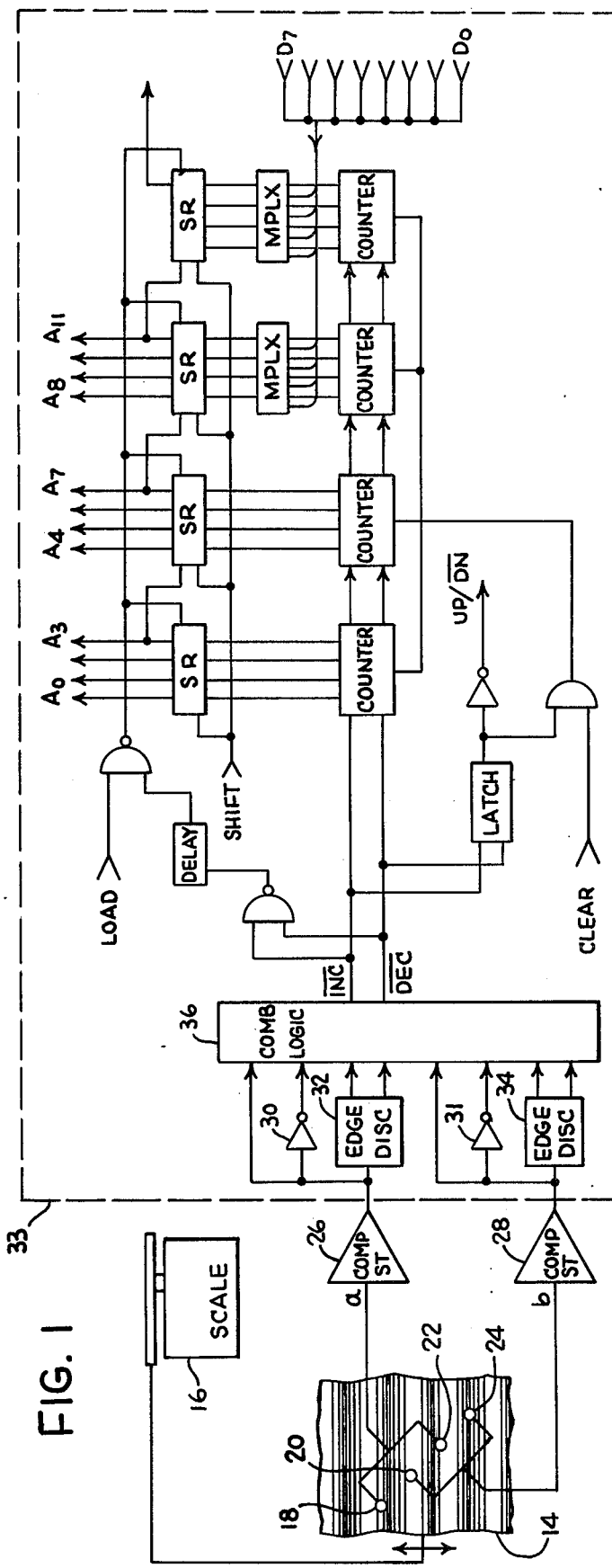
FIG. 1 is a schematized block diagram of a mailing system constructed in accordance with and embodying the invention and illustrating a scale transducer interconnected to an intergrated circuit interface.
Figure 2:
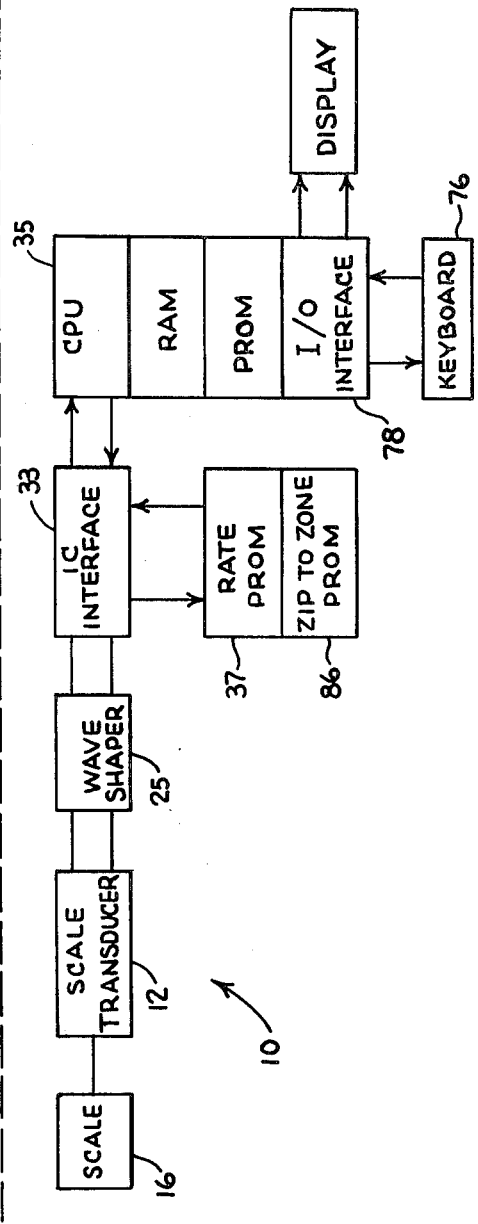
FIG. 2 is a further schematized block diagram of the mailing system illustrating the interaction between the interface, a central processing unit, an external memory and the scale transducer.

Referring now in detail to the drawings, the reference numeral 10 (FIG. 2) denotes generally a mailing system constructed in accordance with and embodying the invention. The system 10 is adapted to process electro-optically transduced signals generated by a transducer 12 upon which a periodic fringe pattern 14 is projected. The fringe pattern 14 may comprise a moire pattern optically coupled to a tare of a spring scale 16 such that the fringe pattern moves as an optically amplified function of scale tare displacement as more fully set forth in the foregoing copending related applications. It should be appreciated, however, that the present invention is well adapted for the processing of cyclic signals generated in any counting environment.

The transducer 12 comprises four phototransistors 18, 20, 22 and 24, all having similar operating characteristics. From an observation of FIG. 4, it will be appreciated that the photo transistor 18 is coupled between a positive potential and the collector electrode of the transistor 24. Thus, the transistors 18 and 20 provide a bias for the phototransistors 22, 24, respectively, in lieu of conventional biasing resistors.

The biasing or compensating phototransistors 18, 20 increase the range of output voltage for the phototransistors 22, 24 and provide compensation for changes in source radiation, atmospheric conditions, temperature changes, etc., which affect the biasing and biased phototransistors simultaneously. Thus, a dynamic bias is provided which maintains the operating characteristics of the phototransistors 22, 24 in a manner similar to that disclosed in U.S. Letters Patent No. 3,913,095 issued Oct. 14, 1975 to Dlugos and assigned to the assignee of the present invention.

Figure 3:
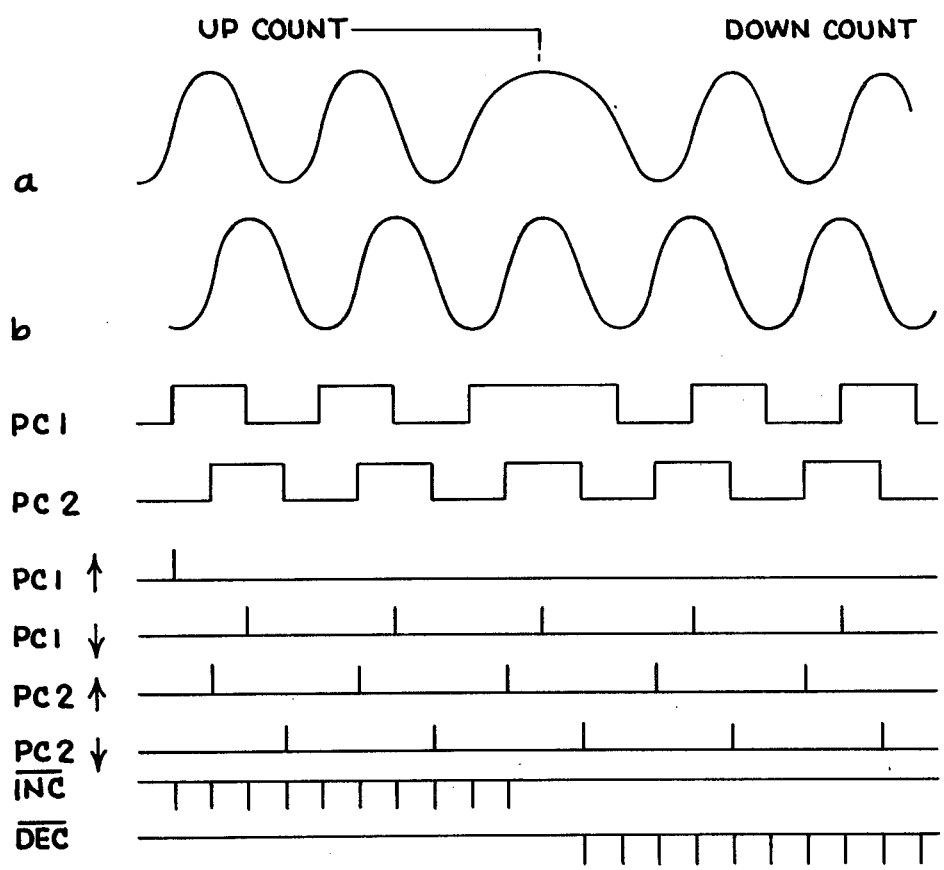
FIG. 3 is a waveform timing diagram of a transducer wave shaping and initial interface circuits of the system.

Movement of the fringe pattern 14 across the phototransistor array provides substantially sinusoidal cyclic waveform outputs designated waveform a and waveform b in FIG. 3 from the collectors of the transistors 22, 24, respectively. Each of the analog waveforms a and b are fed to a wave shaping circuit 25 comprising a linear voltage comparator Schmitt trigger inverter 26, 28, respectively, to generate a pair of pulse waveforms designated $\overline{PC1}$ and $\overline{PC2}$, respectively.

In accordance with the invention, the pulse waveforms $\overline{PC1}$ and $\overline{PC2}$ are further processed to provide an indication of the weight of an article placed on the scale 16 through the utilization of an integrated circuit interface 33 between the wave shaping circuit 25, a microprocessor 35 and an external memory, e.g. a PROM 37.

Figure 5:
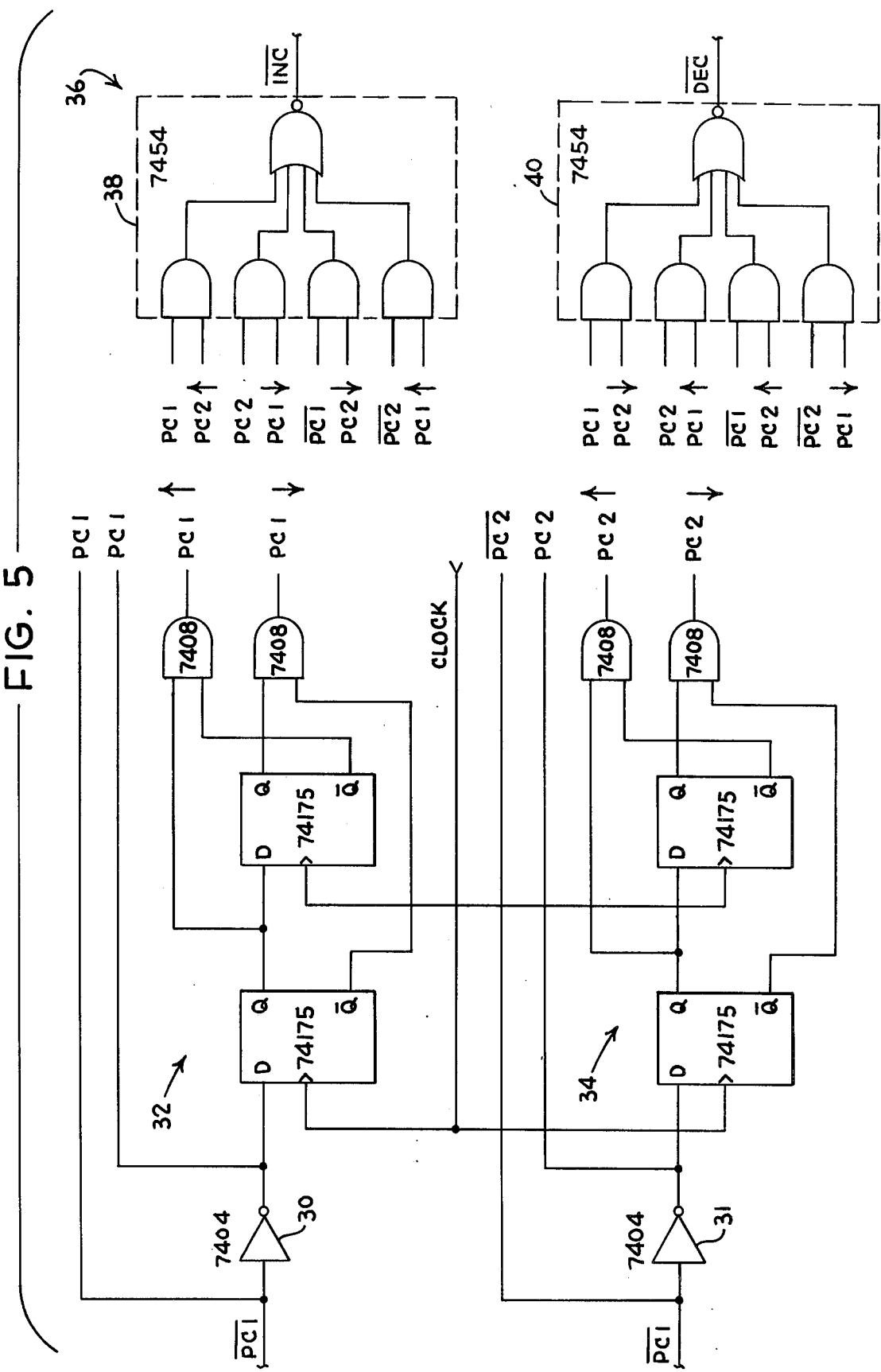
FIG. 5 is a schematic diagram of initial stages of the interface including edge discriminating circuits which provide multiple counts from the pulse waveforms and further showing a combination logic which decodes direction determinative information to provide count incrementing and decrementing signals for a counter array.
Figure 6:
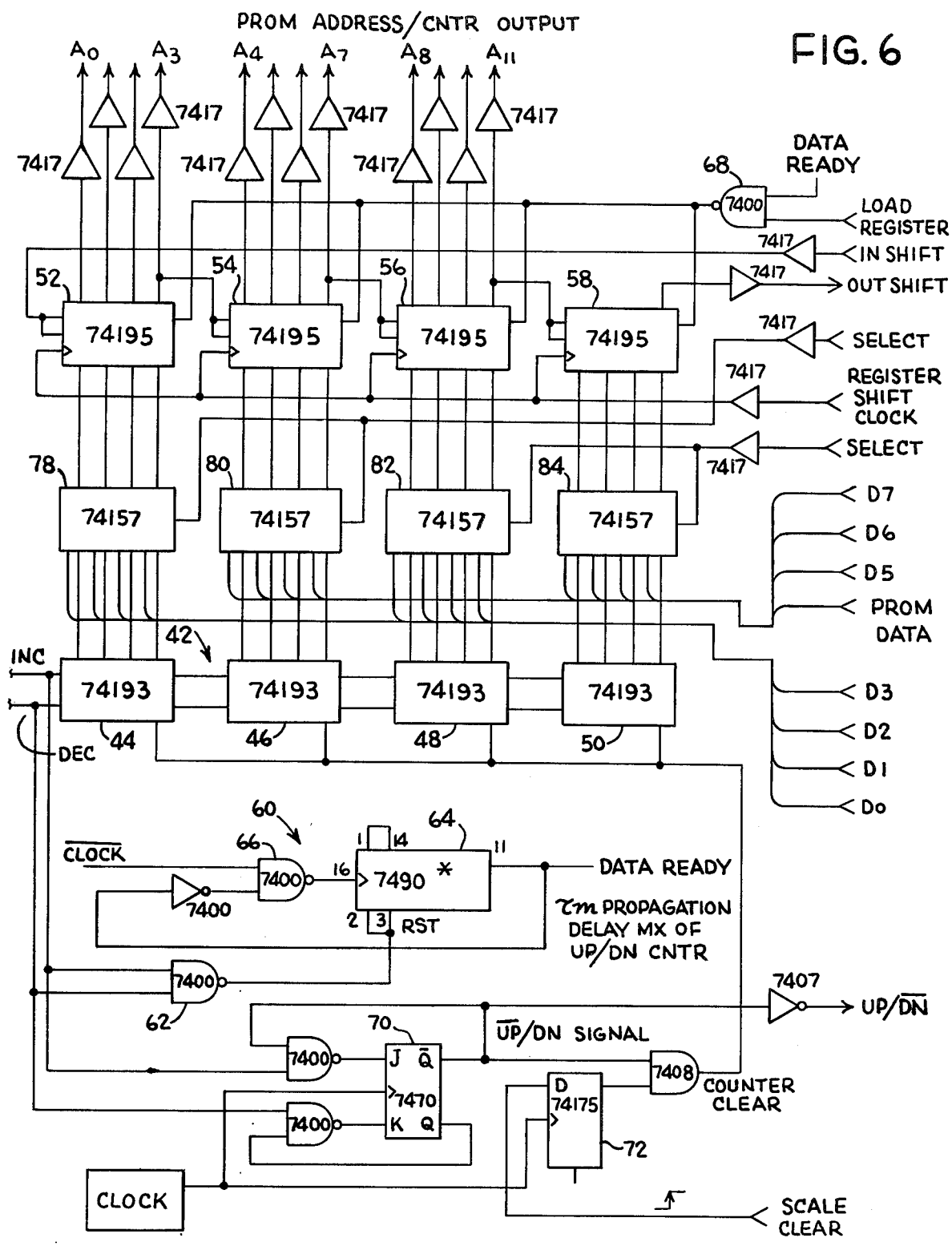
FIG. 6 is a schematic diagram of subsequent stages of the interface including the counter array interconnected to multifunction shift registers for loading count data into a processor as well as for memory addressing and for temporary data storage.

With reference to FIG. 5 wherein initial circuits of the interface are depicted, it will be seen that a pair of inverters 30, 31 provide inverse waveforms PC1 and PC2, respectively, from the signals $\overline{PC1}$ and $\overline{PC2}$.

The waveforms PC1 and PC2 are edge discriminated at a pair of edge discriminators 32 and 34, respectively, to provide a pulse waveform PC1 ↑ (indicating a positive going edge of PC1) and a waveform PC1 ↓ (indicating a negative going edge of PC1). Similarly, the edge discriminator 34 provides a waveform PC2 ↑ and a waveform PC2 ↓ indicating positive and negative going edges of the waveform PC2. The edge discriminators 32, 34 each comprise a pair of fully clocked D-Type edge-triggered flip-flops operating as shift registers and providing a multiplication by four, i.e. four pulses for each cycle of the fringe pattern. Decoding of the flip-flop outputs by a pair of AND gates provides the transition waveforms PC1 ↑, PC1 ↓, PC2 ↑ and PC2 ↓.

The digital waveforms thus generated are decoded at a combination logic 36 which comprises a pair of expandible 4 wide 2 input AND OR invert gates 38, 40, respectively. The combination logic 36 decodes for count direction information to provide inverse pulse waveform signals $\overline{INC}$ and $\overline{DEC}$ indicative of increasing and decreasing scale tare displacement, respectively.

With reference now to the waveform timing diagram of FIG. 3, the waveforms a and b are shown progressing first through an up count and then through a down count. The corresponding digital signals PC1 and PC2, the edge discriminated signals PC1 ↑, PC1 ↓, PC2 ↑ and PC2 ↓, and the signals $\overline{INC}$ and $\overline{DEC}$ are also depicted. It will be appreciated that the combination logic 36 generates the displacement direction decoded signals $\overline{INC}$ and $\overline{DEC}$ in accordance with the following equations:

$$\overline{(PC1)(PC2\uparrow)+(PC2)(PC1\downarrow)+(PC1)(PC2\downarrow)+(PC2)(PC1\uparrow)}=\overline{INC}$$

$$\overline{(PC1)(PC2\downarrow)+(PC2)(PC1\uparrow)+(PC1)(PC2\uparrow)+(PC2)(PC1\downarrow)}=\overline{DEC}$$

In accordance with the invention, the increasing and decreasing waveforms $\overline{INC}$ and $\overline{DEC}$ are provided for processing as inputs to the count up and count down inputs of the first stage of an up/down counter array 42. The counter array 42 is exemplary of many possible variations and has been designed for utilization in conjunction with the operating parameters of the leaf spring scale 16 utilizing a moire fringe pattern optical detector and the transducer 12. In such application the spring constant and optical moire displacement amplification calibration provide a least significant bit indicative of a scale displacement produced by a specified minimum weight increment. The processing system of the present invention, however, is adapted for application in numerous counting environments, and decoding for weight indicative information is by way of example only.

The counter 42 includes four counter stages 44, 46, 48, and 50, each comprising a four bit binary up/down counter. The counters are cascaded by feeding the borrow and carry outputs to the count down and count up inputs respectively of succeeding counters in the array.

The bit output of each counter stage 44, 46, 48 and 50 is broadside loaded through respective multiplexers into corresponding four bit nontransparent parallel access shift registers 52, 54, 56 and 58, respectively.

The shift registers 52, 54, 56 and 58 sample and hold the counter bit outputs upon a LOAD REGISTER signal from the microprocessor 35. In order to insure that the shift registers will not be loaded with counter bit data during the propagation of a count through the counter array 42, a data ready circuit 60 provides a DATA READY signal which permits loading of the shift registers only after count propagation has been completed.

The data ready circuit 60 includes a NAND gate 62 which samples both the $\overline{INC}$ and $\overline{DEC}$ signals. When incoming $\overline{INC}$ and $\overline{DEC}$ pulses enter the counter array 42, a series of low signal pulses is provided as an input to the gate 62 which gate provides corresponding high output signals. Only when there is an absence of fringe pattern movement with both the $\overline{INC}$ and $\overline{DEC}$ signals high will there be a low output from the gate 62. The high output signal of the NAND gate 62 is utilized to reset a decade counter 64 (7490) having a cycle period at least as great as the time required for propagation of counts through the entire counter array 42.

A high counter reset signal from the gate 62 provides a low DATA READY output signal from the counter 64. The low DATA READY output signal is inverted and fed to a NAND gate 66 along with a $\overline{CLOCK}$ signal to provide pulse signals for driving the counter 64. A high DATA READY signal will be provided only after a specified time interval after an absence of fringe pattern movement which interval is synchronized with count propagation time of the $\overline{INC}$ and $\overline{DEC}$ signals through the counter array 42.

The high DATA READY signal is provided at a further NAND gate 68 along with a LOAD REGISTER control signal from the microprocessor 35 to provide a low parallel load signal to the shift registers 52, 54, 56 and 58 which will then sample and hold the counter bit outputs of the various counter stages 44, 46, 48 and 50.

It should be appreciated that unless the $\overline{INC}$ and $\overline{DEC}$ signals are at rest and therefore the counter array is not receiving any further incoming pulses, the counter 64 of the DATA READY circuit 60 is constantly being reset and the DATA READY signal will remain low for the propagation to thereby prevent loading of the shift registers with erroneous data.

The direction of scale tare displacement is readily examined through the utilization of a latch 70 comprising a JK flip flop which receives the signals $\overline{INC}$ and $\overline{DEC}$. The latch output is further utilized to provide a condition on clearing the counter array 42. Thus, when the scale tare is oscillating about zero displacement, a SCALE CLEAR request signal, clock synchronized at a D flip flop 72 is provided at a NAND gate 74 along with the $\overline{Q}$ output of the latch 70 to provide a synchronous COUNTER CLEAR signal assuring that the counters will only clear in the positive edge of zero displacement.

As mentioned heretofore, the mailing system of the present invention is adapted to compute the postage required for the article to be weighed on the scale 16. Among the factors in computing postage for articles are current postage rate class schedule data, zone destination data and conversion data to provide zone destination wherein only a zip code is known. External input to the microprocessor 35 for destination input is provided by a keyboard 76 and an associated input/output interface 78.

In an exemplary application of the system 10, counter data sampling is shifted into the microprocessor 35 and the parallel outputs from the shift registers are utilized as memory address lines for the postage rate PROM 37. In coordination with keyboard addressing data, the counter bit data is parallel loaded into the shift registers and upon appropriate signal of the microprocessor 35, the information is shifted from the shift registers into the microprocessor. The microprocessor 35 receives the counter bit information four or eight bits at a time and after all 16 bits representing a complete count sample have been received, the sample is stored in preparation for averaging of a series of count samples.

Prior to or after counter sampling is accomplished and appropriate computations have been performed to provide an average weight determination, the microprocessor receives manual input keyboard information relating to the class of transportation and destination.

Only the initial three registers 52, 54 and 56 are provided with addressing ability in the system application illustrated; however more registers could be added, if required. Thus, a keyboard generated signal comprising two twelve bit words may be shifted in two stages into the first three shift registers 52, 54 and 56 and will be available for memory addressing. Assuming indirect addressing of the rate PROM 37, the first twelve bits of the keyboard signal are serial loaded into the shift registers to locate the first segment of the indirect address in the rate PROM 37 via a plurality of addressing lines A-0 through A-11.

An initial eight bit segment of the address data obtained from the PROM 37 is utilized as an input to the multifunction shift registers 56, 58 on a plurality of data lines D-0 through D-7. In order to receive the indirect address segment at the shift register 56, 58 the microprocessor 35 first provides an appropriate low SELECT or steering signal to a pair of multiplexers 82, 84, each selectively interconnecting either the stages 48, 50 of the counter array or the data lines D-0 through D-3 and D-4 through D-7, respectively, with the associated shift register 56, 58 for parallel loading at a low SELECT signal.

In order to provide greater versatility for the interface 33, the counter stages 44 and 46 are similarly interconnected to their respective shift registers 52, 54 via corresponding multiplexers 78 and 80. Separate SELECT signals are provided for the multiplexer pair 78, 80 and the multiplexer pair 82, 84.

In sequence, the second twelve bit portion of the keyboard rate address signal is shifted into the shift register array. It should be appreciated that during the twelve clock pulses within which the second portion of the keyboard address is shifted in, the eight bits of PROM 37 address data are shifted out to the microprocessor 35 along with four bits of the prior keyboard address (previously in the register 54) which is discarded.

The second portion of the keyboard signal beconmes available on the address lines, and eight bits of corresponding address data from the PROM 37 become available on the data lines D-0 through D-7. In the manner previously described with respect to the prior address data, such data is parallel loaded to the shift registers 56, 58 via the multiplexers 82, 84.

Subsequently, the final portion of the indirect address data is shifted from the shift registers 56, 58 into the processor in eight clock pulses to thereby provide the processor with the full 16 bits of address necessary to read the rate table. With respect to such 16 bit address, the first four bits are for reference indicating, for example, the size of the table, while the remaining 12 bits comprise the table address.

A keyboard generated zone destination signal provides a four bit word for storage in a zone register of the processor 35. If the operator is aware of the destination zip code but not the zone, a keyboard generated 12 bit zip direct address signal is utilized to address a zip to zone PROM 86 via the addressing lines A-0 through A-11. In a manner similar to that heretofore described with reference to the keyboard rate address signals, the zip address signal is shifted into the registers 52, 54 and 56 to address the PROM 86. The corresponding 4 bit PROM zone data is received through the lines D-0 through D-3 and loaded into the shift register 58 via the multiplexer 84. The microprocessor 35 then receives the zone data by shifting it from the register 58. With the zone data and rate table address data received in the microprocessor, the microprocessor may proceed to determine the required postage.

Initially, the twelve bit table address is shifted from the microprocessor to the shift registers 52, 54, 56 and utilized to address the PROM 37. Computation of postage requires six data words, each comprising eight bits, which constitutes rate parameter data. Two data words are necessary to determine the intercept or equation starting value; two data words are required to determine the equation slope or price increment per weight unit; and two data words are required to determine the equation range capacity or maximum weight for the postage class.

After the table address data has been utilized to address the PROM via the addressing lines A-0 through A-11, a first eight bit corresponding data word of the PROM 37 becomes available on the data lines D-0 through D-7 of the interface. An appropriate SELECT signal generated by the microprocessor results in the parallel loading of the data word into the shift registers 56, 58. It should be appreciated that simultaneously with the loading of the data word, the portion of the prior address in the register 56 is destroyed.

To obtain the next sequential rate data word, the processor is programmed to increment the prior address by one and sequentially serial load the shift registers 52, 54, 56 to provide such address on the addressing lines A-0 through A-11. In accordance with the invention, the multifunction shift registers 52, 54, 56 and 58 provide a savings in handling time by permitting the microprocessor to simultaneously receive the eight bit data word stored in the registers 56 and 58, while loading in the next sequential address. Thus, within the twelve clock pulses required to shift in the next sequential address, the eight bit data words stored in registers 56,58 are pulled into the microprocessor along with four bits of the prior address previously held in the register 54. It should be appreciated that the portion of the prior address is not longer utilized by the processor.

With the next sequential address on the data lines A-0 through A-11 the corresponding eight bit rate data word will be available on the data lines D-0 through D-7 and in a manner identical to that heretofore described with respect to the prior data word, it is parallel loaded into the shift registers 56, 58 and subsequently pulled into the microprocessor simultaneously with the loading of the next sequential address.

After the intial six data words are received in the microprocessor 35, the processor is programmed to determine whether the information pulled is appropriate for computing the requisite postage for the destination zone. If the information is not appropriate, the microprocessor continues incrementing the table address to the PROM 37 until the appropriate data words have been obtained for postage computation.

Postage calculations in accordance with the present invention could very well proceed in accordance with the following example. Assume a package weighing twelve pounds is to be mailed by priority mail to a determined destination in zone 4. The USPS priority mail table for zone 4, as well as for all other zones presently comprises a first table with weight increments at one half pound intervals for weights between one pound and five pounds and a second table with a different starting value and a different slope at one pound increments for articles weighing between five pounds and seventy pounds.

Initial memory addressing of class and zone data (transportation information) would provide data words, i.e. the rate parameters, from the memory for the first priority mail table. Since the twelve pound article weight is to be mailed, such weight is not appropriate for the first table since the article weight exceeds the five pound capacity (maximum weight) of the first table. In accordance with the present invention, the microprocessor continues to increment the table address until the data words (rate parameters) for the second priority mail table, zone 4, are obtained. Since the article weight of twelve pounds is appropriate and falls within the five to seventy pound range of the second priority mail table, zone 4, the processor then generates the amount of postage by adding to the starting dollar value a value equivalant to the number of increments between five pounds and twelve pounds multiplied by the price increment per weight unit to obtain the postage amount required.

It should be appreciated that the versatility of the interface 33 is further enhanced through the implementation of the multiplexers 78 and 80 which increase the parallel loading capacity of the shift register array. Additionally, it should be noted that the data lines D-0 through D-15 could be utilized as input lines for any peripheral device associated with the system, for example photodetectors monitoring other stages of the system. Further, the multiplexers could be utilized as a selective interconnection between the shift registers and any peripheral device rather than the counter stages illustrated.

The microprocessor implementation described is only one example of many possible variations possible in mailing systems. In addition to the exemplary embodiment herein described, further embodiments of the invention include variations such as utilization of the parallel output lines A-0 through A-11 for unloading counter data. It should be understood that the invention may encompass implementation of the multifunction shift registers as an element of an interface operatively interconnecting any microprocessor, an external memory and one or more peripheral devices.

Thus, it will be seen that there is provided a mailing system which achieves the various objects of the present invention and which is well suited to meet the conditions of practical use.

As various changes might be made in the system as above set forth, it is to be understood that all matters herein described or shown in the accompanying drawings are to be interpreted as illustrative and not in a limiting sense.

Having thus described the invention, there is claimed as new and desired to be secured by Letters Patent:

1. A weighing system for weighing an article, the system including a spring scale for measuring the weight of the article as a function of the deflection of a load support for carrying the article, the scale comprising means for generating an optical cyclic pattern, the generating means including means moving the pattern as a function of the load support deflection, optoelectronic transducer means, the pattern being projected upon the transducer means, the transducer means generating a pair of cyclic waveforms as a function of the deflection of the load support, the system further including an interface and a processing unit, the interface being disposed in the system between the transducer means and the processing unit, the interface including digital wave shaping means, the digital wave shaping means receiving the cyclic waveforms and in response thereto providing a pair of shaped digital waveforms, sensing means, the sensing means receiving the shaped waveforms and sensing movement of the load support and to provide one series of pulses indicative of movement in one direction and another series of pulses indicative of movement in an opposite direction, counting means coupled to the sensing means to receive either one of said series of pulses, and in response thereto in one instance adding the pulses of one series and in another instance subtracting the pulses of the other series to provide counter information indicative of the measure of said load support movement, and register means, the register means receiving the counter information and storing and transferring the counter information to the processing unit, the processing unit receiving the counter information and in response thereto processing said counter information for determining article weight.

2. A mailing system constructed in accordance with claim 1 wherein the register means includes means for receiving the counter information in a parallel mode and for serially transferring the counter information to the processing unit.

3. A mailing system constructed in accordance with claim 1 further including a memory, the register means including means for receiving a memory address, and means for transferring the memory address in a parallel mode, the parallel mode transfer means for addressing the memory, the register means for selectively receiving the counter information and the memory address.

4. A mailing system constructed in accordance with claim 3 wherein the register means includes means for serially receiving a memory address from the processing unit.

5. A mailing system constructed in accordance with claim 3 wherein the register means includes means for selectively receiving the counter information and memory information located at the memory address in a parallel mode.

6. A method for determining transportation charges necessary to transport an article, which charges are dependent on article weight and transportation information, using a microprocessor operatively connected to a memory, the method comprising the steps of
   inputting weight indicative information to the microprocessor,
   inputting class information to the microprocessor,
   accessing the memory with class information to obtain rate parameter data,
   inputting rate parameter data at the access address into the microprocessor,
   processing the rate parameter data to determine if the weight indicative information falls within the range of the rate parameter data,
   incrementing the access information if the rate parameter data is inappropriate for the weight indicative information,
   accessing the memory with incremented access information,
   inputting the rate parameter data at the last incremented access address to the microprocessor,
   processing the last rate parameter data to determine if appropriate for the weight indicative information,
   continuing to increment access information, to input rate parameter data and to determine if the rate parameter data is appropriate until appropriate rate parameter data is obtained, and
   processing the appropriate rate parameter data and the weight indicative information to generate transportation charges for the article.

7. A method in accordance with claim 6 wherein the transportation charges are dependent on class information and destination information, the step of accessing the memory including the accessing with destination information.

UNITED STATES PATENT AND TRADEMARK OFFICE
CERTIFICATE OF CORRECTION

PATENT NO. : 4,131,946
DATED : December 26, 1978
INVENTOR(S) : Daniel F. Dlugos

It is certified that error appears in the above—identified patent and that said Letters Patent is hereby corrected as shown below:

Column 1, line 30, "evironments" should read -- environments --.

Column 1, line 54, "Tradionally" should read -- Traditionally --.

Column 5, lines 4 and 8, both equations, should appear as shown below:

$$\overline{(PC1)(PC2\uparrow)} + \overline{(PC2)(PC1\downarrow)} + \overline{(PC1)}(PC2\downarrow) + \overline{(PC2)}(PC1\uparrow) = INC$$

$$\overline{(PC1)(PC2\downarrow)} + \overline{(PC2)(PC1\uparrow)} + \overline{(PC1)}(PC2\uparrow) + \overline{(PC2)}(PC1\downarrow) = DEC$$

Column 7, line 26, "beconmes" should read -- becomes --.

Column 8, line 26, "not" should read -- no --.

Column 9, line 2, "equivalant" should read -- equivalent --.

Signed and Sealed this

Sixteenth Day of February 1982

[SEAL]

Attest:

GERALD J. MOSSINGHOFF

Attesting Officer    Commissioner of Patents and Trademarks